United States Patent [19]

Runde et al.

[11] Patent Number: 4,738,737
[45] Date of Patent: Apr. 19, 1988

[54] METHOD OF USING A HIGH TEMPERATURE ULTRASONIC COUPLANT MATERIAL

[75] Inventors: Herbert A. Runde, Windsor Locks; Donald C. Bettencourt, West Granby, both of Conn.

[73] Assignee: Combustion Engineering, Inc., Windsor, Conn.

[21] Appl. No.: 869,793

[22] Filed: Jun. 2, 1986

[51] Int. Cl.$^4$ ............................................. B32B 31/16
[52] U.S. Cl. ........................................ 156/91; 156/329; 252/518; 428/450
[58] Field of Search ................. 156/91, 329; 252/518; 428/450; 524/783

[56] References Cited

U.S. PATENT DOCUMENTS

| | | | |
|---|---|---|---|
| 3,970,504 | 7/1976 | Palmer | 156/329 |
| 4,069,083 | 1/1978 | Palmer | 156/329 |
| 4,092,192 | 5/1978 | Magyari | 156/329 X |

Primary Examiner—Robert A. Dawson
Attorney, Agent, or Firm—John H. Mulholland

[57] ABSTRACT

A couplant material for establishing a sound path of good acoustical impedance between a transducer and a supporting wave-transmitting substrate which is capable of being easily shaped at room temperature, withstanding thermal cycling from room temperature to over 450° F., and substantially maintaining its acoustical properties in a radiation atmosphere while providing a minimum of irritating fumes and outgassing. The couplant material is a non-flammable, grease-like silicone fluid heavily filled with zinc oxide. It has been used previously as a heat sink compound for electronic components.

1 Claim, 1 Drawing Sheet

METHOD OF USING A HIGH TEMPERATURE ULTRASONIC COUPLANT MATERIAL

BACKGROUND OF THE INVENTION

The present invention relates to a means and method of attaching an ultrasonic transducer to a surface. It is frequently necessary to bond ultrasonic transducers to surfaces in an environment in which the bonding material will be subject to high temperatures and radiation. One example is the use of ultrasonic flowmeters to monitor flow in the primary loop of nuclear power generating systems. The bonding material in these situations may be subjected to temperatures as high as 650° F. and radiation levels as high as 50R (Roentgen) per hour. Investigations have shown that conventional, commercially available ultrasonic couplants are unsuitable for such conditions. For example, the commonly available colloidal grease type couplants will exhibit an excessive degree of thermal outgassing with eventual loss of physical properties and loss of mechanical bonding. Such changes would initially lead to constantly changing ultrasonic modulation which could generate erroneous ultrasonic data. Based on outgassing data, the in-service life of common high temperature couplants would be no greater than 700 hours at the temperature encountered in nuclear reactor service. It is further estimated that under irradiation conditions, and with subsequent loss of adhesion and mechanical properties due to both the thermal and irradiation embrittlement, the useful service life of commercial couplants would be no greater than 50 hours. Because of this relatively short predicted service life, frequent changing of the couplant would be necessary. Radiation exposure levels as well as inaccessibility of the monitoring sites would make such a practice prohibitive.

Accordingly, there has been a longstanding need for a couplant which:

(1) Provides required acoustical properties in the form of a sound path of good acoustical impedance between a transducer and the supporting wave-transmitting substrate, pipe or reactor flow passage to which it is attached;

(2) Withstands thermal cycling from room temperatures to temperatures over 450° F., which are common in nuclear power generating system flow path structure surfaces upon which the flowmeter may be mounted;

(3) Maintains stable acoustical properties at temperatures over 450° F., and typically in the range of from 500° F. to 650° F., for periods of time which may be as great as multiyear periods between planned nuclear reactor outages;

(4) Provides a minimum of irritating fumes or outgasses which may disturb the sound path;

(5) Is resilient and of a viscosity which provides for ease of application and use; and, (6) Does not require expensive surface preparation of the substrate or nuclear power generation system flow path structure surfaces in the field, such as by grinding or machining.

In search of a couplant which would answer all of these longstanding needs, the laboratories of the assignee of the present invention produced the invention of U.S. Pat. No. 3,970,504 and subsequently began the study of eighteen candidate high temperature and lubricant release materials which were available commercially for other uses. Eleven of the candidates were immediately dismissed as chemically unsuitable in that they turned out to have objectionably high sulfur or lead contents. Two of the remaining seven had an inability to perform the ultrasonic couplant function above 350° F. Another candidate had a viscosity which was too stiff for easy use as an ultrasonic couplant. Four were worthy of further testing with regard to hazardous or irritating fumes and controlled use on actual weldments. They were rated and the most likely three to solve the problems came from the same source, Dow Corning Corporation of Midland, Mich., 48640. A review of materials from that source, indicated the availability of a grease-like silicone fluid material heavily filled with heat conductive metal oxides and designated "DOW CORNING 340 Heat Sink Compound".

After laboratory oven test for high temperature longevity of the heat sink compound as a potential ultrasonic couplant were successfully performed, the material was used at two nuclear reactor sites on pipe surfaces carefully prepared by grinding the flowmeter transducer attachment area. Although the material withstood the environment, the surface preparation was found to be too expensive to be a practical field procedure for use. Thus, use of the material as a successful ultrasonic couplant for withstanding the high temperature conditions, without any special grinding or machining surface preparations had to be established. Tests to accomplish this were then successfully carried out in a laboratory autoclave. Testing at a nuclear power generation site ultimately was performed which confirmed these laboratory results.

The "DOW CORNING 340 Heat Sink Compound" used is known for application to the base and mounting studs of transistors and diodes and silicon controlled rectifiers. It is promoted as an effective thermal coupler for any heat sink device where efficient cooling is required. It is also mentioned in the product information literature as a high voltage corona-suppressant, non-flammable coating in connections for flyback transformers in TV sets and similar applications. Although it is stated that it will not dry out, harden or melt, even after long term exposure to temperature up to 200° C. (392° F.), nothing suggests it might be an ultrasonic couplant in a high temperature (over 450° F.) environment.

SUMMARY OF THE INVENTION

The invention is a couplant material and a method of its use for establishing a sound path of good acoustical impedance between a transducer and a supporting wave transmitting substrate. Couplant material of the invention is capable of withstanding thermal cycling from room temperature to temperatures over 450° F., which temperatures are characteristic of the environment in a nuclear power generating system. The couplant material is a non-flammable, grease-like silicone fluid heavily filled with zinc oxide. It is used in accordance with the invention for attaching an ultrasonic transducer to a metal substrate by the steps of applying the non-flammable grease-like silicone fluid containing zinc oxide between the substrate and the ultrasonic transducer and thereafter mechanically securing the ultrasonic transducer to the substrate which might be, for example, a pipe, a nuclear reactor vessel or a steam generator.

DESCRIPTION OF THE PREFERRED EMBODIMENT

Figure 1:
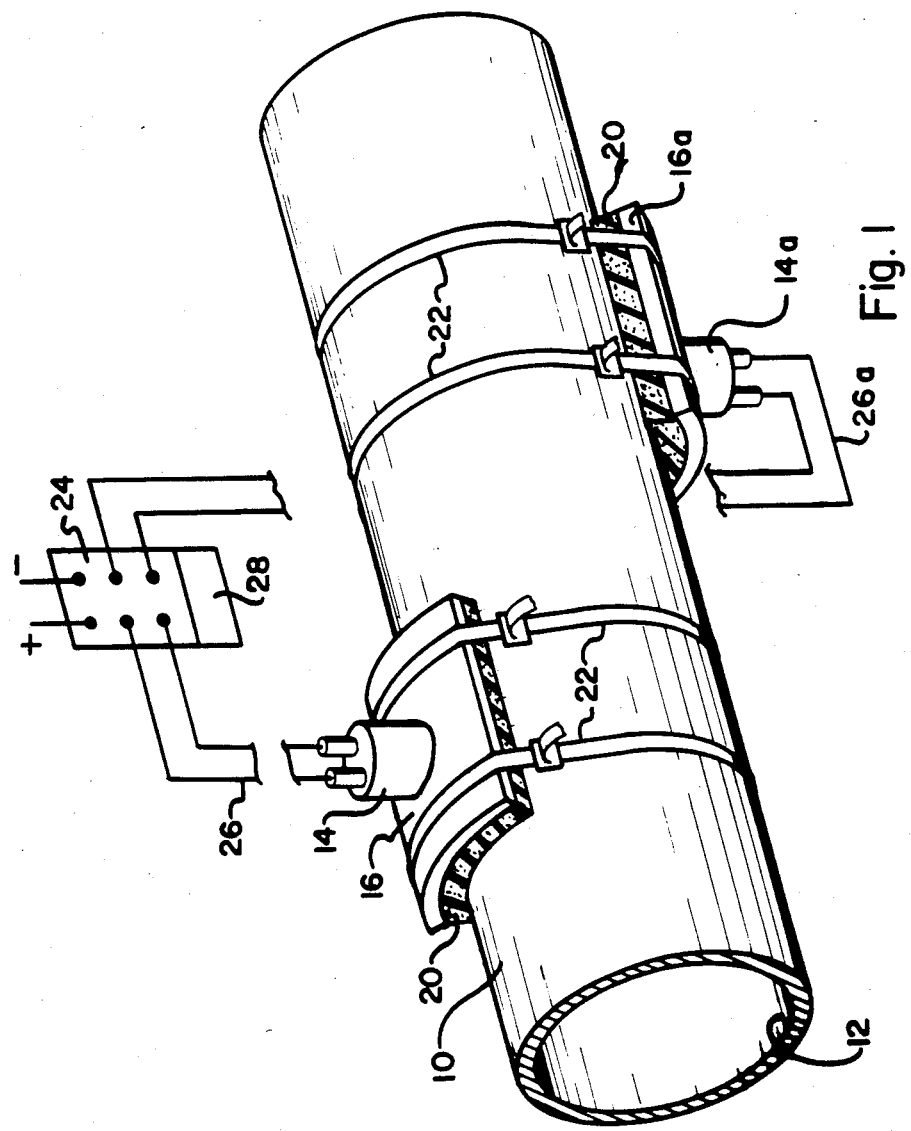
FIG. 1 is a schematic drawing of the couplant of the invention in use with an ultrasonic flowmeter clamped to a pipe.

FIG. 1 illustrates a supporting wave transmitting substrate 10 which may be, for example, a pipe in the primary loop of a nuclear power generating system. The pipe 10 typically will be of a stainless steel alloy or other ferrous material through which fluid material, typically nuclear reactor coolant, flows by means of an internal passageway 12. For reasons which are not here important, it is often desirable to determine the flow rate within the pipe 10. The schematic arrangement of FIG. 1 is illustrative of an ultrasonic system for performing this task.

The ultrasonic flowmeter schematically illustrated may be of a type sold commercially by Controlotron Corporation, 155 Plant Ave., Hauppauge, N.Y. 11788, under the designation "System 960". The Controlotron "System 960" includes transducers 14 and 14a attached by mounting plates 16 and 16a to the substrate or pipe 10. In order to establish a sound path of good acoustical impedance between the transducers 14 and 14a and the supporting wave transmitting substrate 10, the couplant material 20 of the invention, in the form of a non-flammable, grease-like silicone fluid heavily filled with zinc oxide, is applied between the substrate 10 and the ultrasonic transducers 14 and 14a and their mounting plates 16 and 16a. The transducers and plates are then secured to the substrate 10 mechanically by means of straps 22 which clamp them to the pipe 10. Straps 22 are analogous to hose clamps and are schematically shown for illustrative purposes only since any suitable mechanical clamping means may be used. The transducers 14 and 14a are somewhat spaced axially on opposite sides of the pipe in the "System 960" such that flow within the pipe 10 is measured by detecting the difference between upstream and downstream travel time of an ultrasonic pulse injected through the wall of pipe 10 by the transducers 14 and 14a. In the particular arrangement shown, the transducers 14 and 14a alternate as the emitting and receiving transducers. A "flow display computer" 24 is connected by means of cables 26 and 26a to the transducers 14 and 14a respectively. The flow display computer 24 has a display panel portion 28 which gives appropriate digital or analog data output. Means are provided to connect the system to a power source.

When ultrasonic equipment is used in connection with nuclear power generating systems, whether it is in the form of an ultrasonic flowmeters such as used in "System 960" or an ultrasonic flaw detection device, it is important that the couplant material utilized provides a sound path of good acoustical impedance. It is also important that the couplant withstand thermal cycling from room temperature to temperatures over 450° F. and that the acoustical properties remain stable for long periods of time at temperatures which are typically in the range of 500° F. to 650° F. Moreover, a couplant material, to be practical, must provide no irritating fumes, or in any event a minimum of such fumes, to prevent danger to operators and others in the operating environment. It is also important that the couplant material not provide outgassing which would disturb the sound path. All of these traits must be found in a material which is both easy to apply and use and which does not require expensive surface preparation such as by grinding or machining. At most, the pipe, reactor wall or other substrate should require only superficial wire brushing to make the sound path connection with the couplant material.

"The Dow Corning 340 Heat Sink Compound" was described in its product information literature as not drying out, hardening, or melting, even after long-term exposures of temperatures up to 392° F. Its use was for purposes of heat transfer from electrical or electronic devices to a heat sink or chassis, thereby increasing the overall efficiency of the electrical or electronic device. It is an effective thermalcoupler for any heat sink device where efficient cooling is required. In the product literature, the compound was stated to have a shelf life of twelve months from the date of shipment. The consistency of the material under ASTM D 217 was 260.

What applicant has discovered and established is that the material previously known as "Dow Corning 340 Heat Sink Compound", makes an excellent couplant material for establishing a sound path of good acoustical impedance between a transducer and a supporting wave transmitting substrate in applications where there is thermal cycling from room temperature to over 450° F. for sustained periods of time. Laboratory tests of almost three months of temperature cycling were conducted without serious deterioration of the ability of the material to give a sound path of good acoustical impedance. This apparently is because the material is a non-flammable, grease-like silicone fluid, heavily filled with heat-conductive means including a metal oxide which is preferably zinc oxide. Clearly, when the material is placed between a substrate and an ultrasonic transducer and the transducer is mechanically secured to the substrate, a method of obtaining good readings is provided. This method, typically, can be used, as shown in the illustrated embodiment, for ultrasonic flowmetering even in the high temperature and radiation environments of a nuclear power generating system.

We claim:

1. A method of attaching an ultrasonic transducer to a metal substrate with a couplant material to produce a sound path of good acoustic impedance between the transducer and the metal substrate which includes the steps of:

applying a non-flammable grease-like silicone fluid heavily filled with zinc oxide and which at room temperature is easily shaped between said substrate and said ultrasonic transducer, and mechanically securing said ultrasonic transducer to said substrate.

* * * * *